(12) United States Patent
Nowlan et al.

(10) Patent No.: US 6,169,538 B1
(45) Date of Patent: Jan. 2, 2001

(54) METHOD AND APPARATUS FOR IMPLEMENTING A GRAPHICAL USER INTERFACE KEYBOARD AND A TEXT BUFFER ON ELECTRONIC DEVICES

(75) Inventors: Steven Nowlan, San Jose; Kannan Parthasarathy, Palo Alto; Sheridan Rawlins, Sunnyvale, all of CA (US)

(73) Assignee: Motorola, Inc., Schaumburg, IL (US)

( * ) Notice: Under 35 U.S.C. 154(b), the term of this patent shall be extended for 0 days.

(21) Appl. No.: 09/133,751

(22) Filed: Aug. 13, 1998

(51) Int. Cl.[7] ........................................... G09G 5/00
(52) U.S. Cl. .................. 345/168; 345/130; 345/358; 345/347; 345/173; 345/326; 341/22
(58) Field of Search ................. 345/168, 169, 345/173, 174, 179, 326, 334, 342, 347, 130, 127, 901–902, 358; 341/22–23, 24–25, 20; 708/142; 128/19.01, 19.04, 19.05; 382/298–299

(56) References Cited

U.S. PATENT DOCUMENTS

| | | | | |
|---|---|---|---|---|
| 5,748,512 | * | 5/1998 | Vargas | 708/142 |
| 5,818,451 | * | 10/1998 | Bertram et al. | 345/354 |
| 6,054,990 | * | 4/2000 | Tran | 345/358 |
| 6,094,197 | * | 7/2000 | Buxton et al. | 345/358 |

\* cited by examiner

*Primary Examiner*—Richard A. Hjerpe
*Assistant Examiner*—Francis Nguyen
(74) *Attorney, Agent, or Firm*—Terri S. Hughes; Romi N. Bose (57) ABSTRACT

A method and apparatus for implementing a graphical user interface keyboard (10) and a text buffer (12) on an electronic device. A character that is active upon pointer-up is accepted as a text character, even though the character that is active upon pointer-up is different from a character that was active and inserted in the text buffer (12) upon pointer-down.

7 Claims, 8 Drawing Sheets

FIG.1

(PRIOR ART)

METHOD AND APPARATUS FOR IMPLEMENTING A GRAPHICAL USER INTERFACE KEYBOARD AND A TEXT BUFFER ON ELECTRONIC DEVICES

FIELD OF THE INVENTION

The present invention relates to a method and apparatus for implementing a graphical user interface keyboard and a text buffer on electronic devices.

BACKGROUND OF THE INVENTION

Many small hand-held devices that require data entry rely on a graphical user interface (GUI) keyboard. Users typically select the keys of the GUI keyboard using a pointer, such as a stylus or a pen. One difficulty with such an approach is that each key on the GUI keyboard is very small since the whole device itself is small. For such keyboards, positioning the pointer accurately on the desired key is difficult. Moreover, identifying the character selected is difficult because the pointer obscures the character identified on the key.

Figure 1:
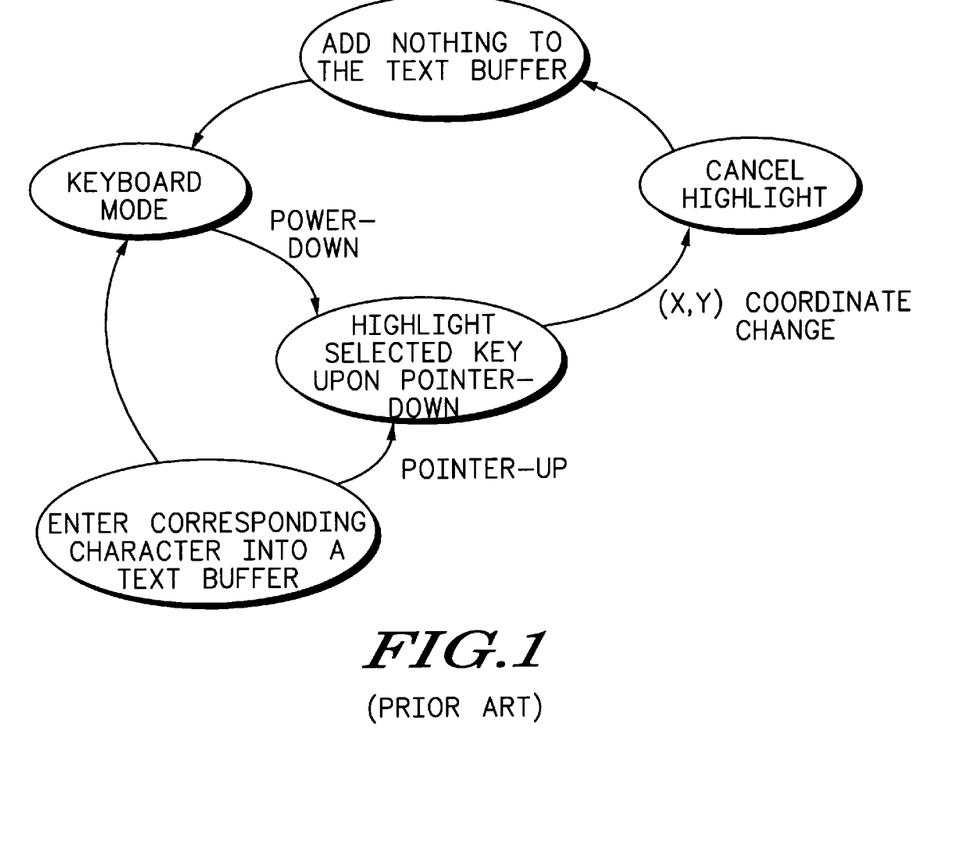
FIG. 1 (prior art) illustrates a state diagram of a method known in the art.

As shown in FIG. 1, one solution to prevent the user from selecting and entering an incorrect character into a text buffer is to highlight the selected key upon pointer-down (i.e., when the pointer first touches the GUI keyboard). If the highlighted key corresponds to the correct character, the pointer is lifted from the GUI keyboard (pointer-up) and the character that corresponds to the highlighted key is entered into the text buffer.

If, however, the highlighted key that was selected upon pointer-down does not correspond to the correct character, the user has to either i) enter the incorrect character into the text buffer and subsequently edit the character by attempting to re-position the pointer accurately on the key that corresponds to the correct character upon pointer-down; or ii) move the pointer beyond the highlighted key to prevent from entering the incorrect character into the text buffer, thus adding nothing to the text buffer.

A problem with this method is that it still requires the user to position the pointer accurately on the key that corresponds to the correct character upon pointer-down in order to enter the correct character into the text buffer. In this method, a character is only entered into the text buffer if the pointer is lifted from the key that was selected upon pointer-down.

Another solution to prevent the user from selecting and entering the incorrect character into the text buffer is to magnify the character that corresponds to the key selected by the pointer. In this process, once a key is selected, its corresponding character is magnified. Such a magnification allows a user to identify the character that corresponds to the key that was selected before the character is entered into the text buffer. If the character that is magnified is incorrect, the user can select another key by moving the pointer across the GUI keyboard to the correct character. After the correct character is magnified, however, the user is required to "double-tap" on its corresponding key in order to enter the correct character into the text buffer.

One problem with this method, however, is that since the device is small, the pointer may also cover the magnified character, thus making it difficult to identify the character that corresponds to the key that was selected even though the character is magnified. Another problem with this method is that even if the magnified character is identifiable, the user is required to "double-tap" on its corresponding key before the character is entered in the text buffer. Such a selection method still requires the user to position the pointer accurately on the key that corresponds to the correct character upon pointer-down.

Thus, a need exists or providing a method and apparatus that easily identifies an active character in an area on the GUI that is not obscured by the pointer, allows subsequent characters to become active after pointer-down and accepts a character as a text character without requiring the pointer to be positioned accurately on the key that corresponds to the accepted character upon pointer-down.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

A method and apparatus for implementing a graphical user interface (hereinafter referred to as "GUI") keyboard on an electronic device, wherein the GUI keyboard comprises a plurality of keys, is described herein. The preferred embodiment of the present invention easily identifies an active character in an area on the GUI that is not obscured by the pointer, allows a subsequent character to become active in place of the previous active character after pointer-down and accepts the character that is active at the time of pointer-up as a text character without requiring the pointer to be positioned accurately on the key that corresponds to the accepted character upon pointer-down. It is important to note that a character "is active" or "becomes active" when its corresponding key is selected. Thus, the active character changes as the pointer selects subsequent characters prior to pointer-up. It should also be noted that the pointer is either a stylus, a finger, a pen or any other object that can be used to select a key on the GUI keyboard.

Figure 2:
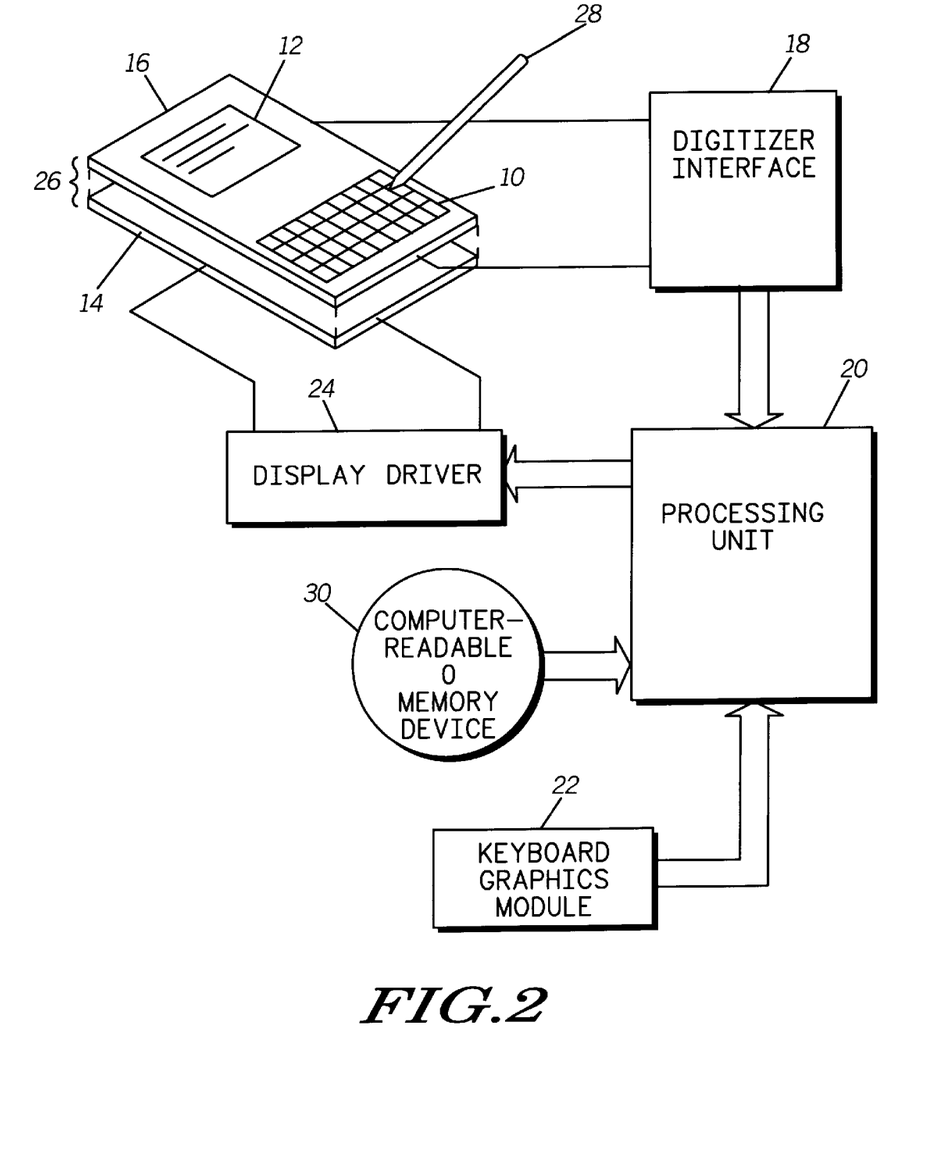
FIG. 2 illustrates a structural block diagram according to the preferred embodiment of the present invention.

The structure of the electronic device according to the preferred embodiment of the present invention is illustrated in FIG. 2. The GUI of the electronic device comprises a GUI keyboard 10 and a text buffer 12. It should be noted that the GUI keyboard 10 can comprise any type of characters (e.g., letters, numbers, special characters, Chinese characters, etc.) and/or display any type of configuration thereof (e.g., the characters displayed in a particular order such as in a QWERTY keyboard).

The internal circuitry of the electronic device comprises a touch sensitive surface 14, a display unit 16 (e.g., a liquid crystal display), an input interface 18, a processing unit 20, a keyboard graphic module 22 and a display driver 24. The touch sensitive surface 14 is overlaid on top of the display unit 16 to create a touch screen 26. Preferably, the touch sensitive surface 14 is a resistive grid, but could alternatively be an inductive grid, capacitance grid or any other touch sensitive surface known in the art.

The input interface 18 is coupled to the touch sensitive surface 14. The input interface 18 translates pressure on the touch sensitive surface 14 into Cartesian coordinates (hereinafter referred to as "coordinates") and transmits the coordinates to the processing unit 20. The coordinates identify the current location of the pointer 28. Thus, as the pointer 28 exerts pressure on the touch sensitive surface 14 by moving across the GUI keyboard 10, the input interface 18 generates new coordinates in order to keep current of the location of the pointer 28.

Figure 3:
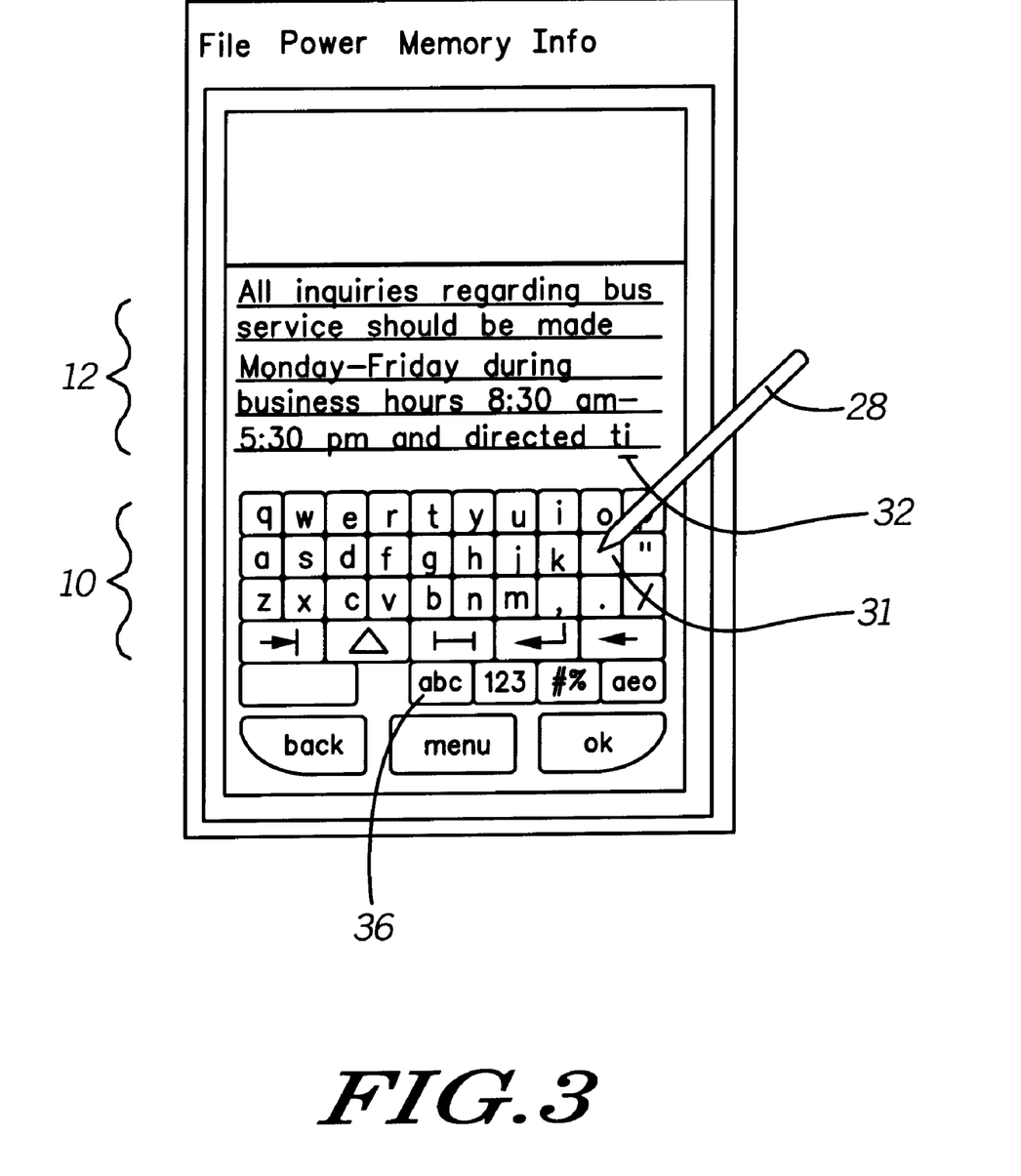
FIG. 3 illustrates a screen shot where a first key is highlighted and its corresponding character is active and inserted in an active position within a text buffer according to the preferred embodiment of the present invention.
Figure 4:
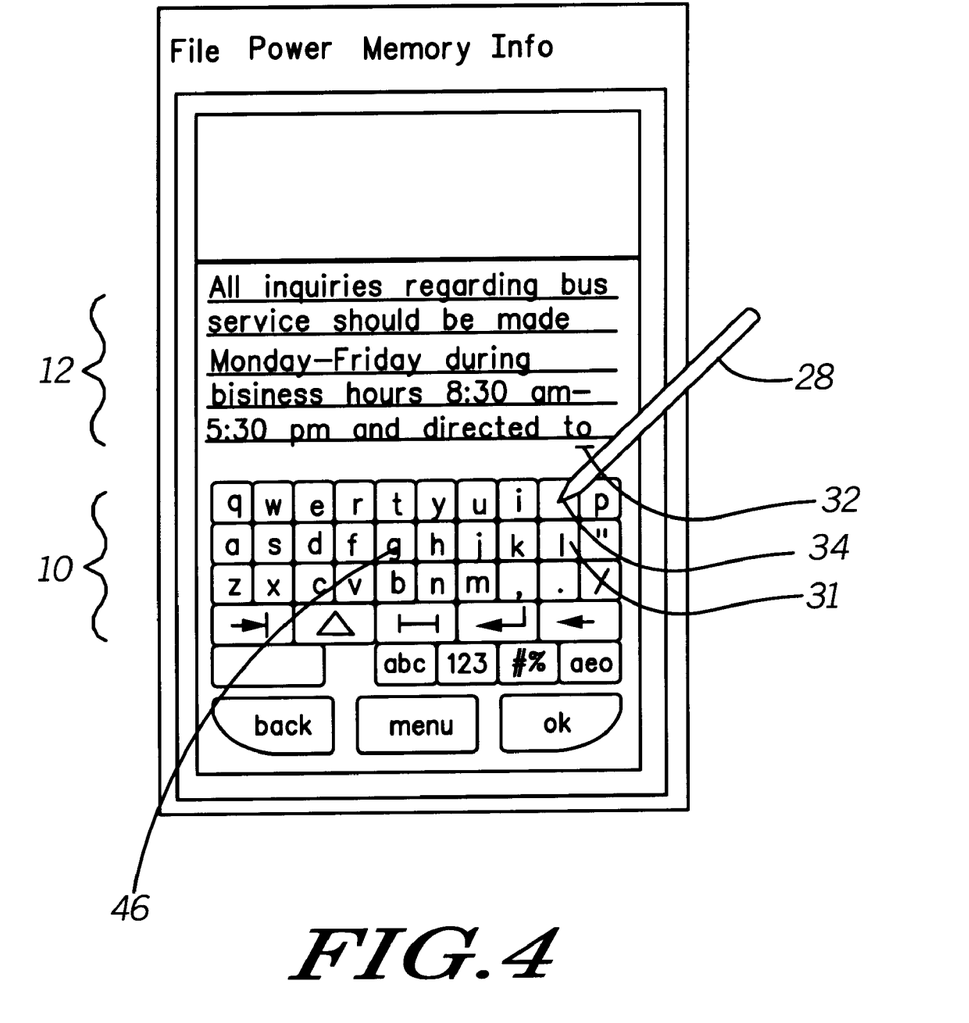
FIG. 4 illustrates a screen shot where a second key is highlighted and its corresponding character becomes the active character inserted in the active position within the text buffer according to the preferred embodiment of the present invention.

The processing unit 20 is coupled to the input interface 18. Upon receiving the coordinates from the input interface 18, the processing unit 20 is programmed by a computer-readable memory device 30 having instructions and data stored therein which, when loaded into the processing unit 20, cause the processing unit 20, as shown in FIGS. 3 and 4, to i) highlight a key 31 that represents the current location of the pointer 28; ii) select and insert a character into an active position 32 within the text buffer 12 that corresponds to the key 31 highlighted to identify an active character; iii) replace the active character, as the pointer 28 moves across the GUI keyboard 10, with a subsequent character that corresponds to the current location of the pointer 28 prior to pointer-up; iv) accept the active character as a text character upon pointer-up; and v) advance the active position 32 upon entry of the text character. It is important to note that as the pointer 28 moves across the plurality of keys on the GUI keyboard 10 prior to pointer-up, the active character inserted into the active position 32 within the text buffer 12 is replaced with a subsequent character (which is now the active character) that corresponds to the current location of the pointer 28.

Referring back to FIG. 2, the keyboard graphics module 22 is coupled to the processing unit 20. The keyboard graphics module 22 communicates to the processing unit 20 the type of characters associated with the GUI keyboard 10 (e.g., special characters, selected characters, Chinese characters, etc.) and/or their configuration displayed on the touch screen 26.

The display driver 24 couples the processing unit 20 to the display unit 16. The output from the processing unit 20 is transmitted to the display driver 24 which turns on or off pixels within the display unit 16.

In operation, as shown in FIG. 3, a character is active and inserted into the active position 32 within the text buffer 12 by selecting a key on the GUI keyboard 10 upon pointer-down. For example, when the key that corresponds to the character "l" is selected (e.g., key 30), the character "l" becomes the active character and is inserted into the active position 32 within the text buffer 12. Inserting the active character, in this case the character "l", in the active position 32 within the text buffer 24 allows the user to easily identify the active character that corresponds to the key 30 selected without solely relying on identifying the active character behind/under the pointer 28. When the pointer 28 is lifted from a key (e.g., key 30), the character that is active (e.g., the character "l") is accepted as a text character and the active position advances upon entry of the text character and waits for the next active character selected and inserted upon the next pointer-down.

Moreover, the present invention resolves the difficulty of accurately selecting a key that corresponds to the desired character upon pointer-down. For instance, as shown in FIG. 4, suppose that the user wants to make the character "o" a text character, but instead selects the key that corresponds to the character "l" (i.e., key 31) upon pointer-down (since the key corresponding to the character "o" (key 34) and the key corresponding to the character "l" (key 30) are in close proximity to one another on the GUI keyboard 10). As a result, the character "l" is active and inserted in the active position of the text buffer. The present invention allows the user to make the character "o" active by sliding the pointer 28 from key 31 to key 34. If the character "o" remains active (i.e., the pointer 28 has not moved outside the boundary of key 34) when the pointer 28 is lifted from the GUI keyboard 10, the character "o" is accepted as a text character, regardless of the fact that the character "l" was the active character upon pointer-down.

Figure 5:
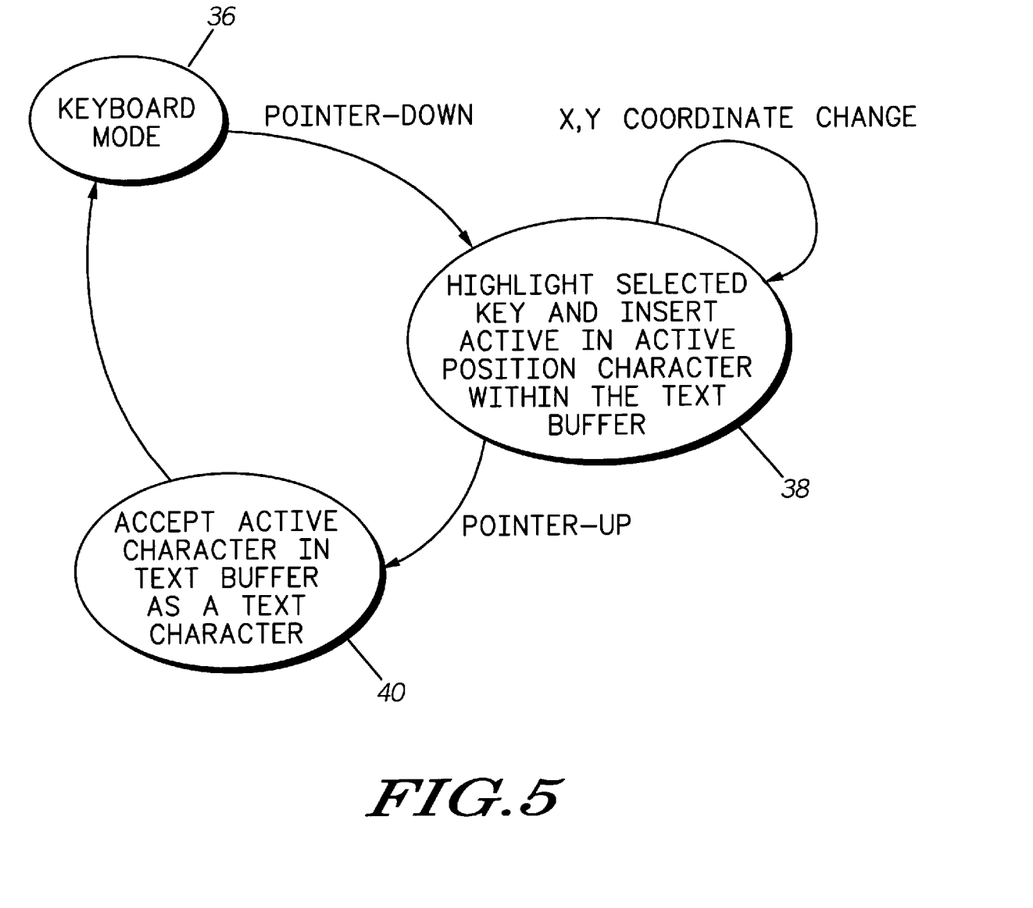
FIG. 5 illustrates a state diagram according to the preferred embodiment of the present invention.

A further example is illustrated in FIG. 5 using a state diagram. In operation, a user enters a keyboard mode (See state 36) and selects a key upon pointer-down. The selected key is highlighted and its corresponding character becomes active (See state 38). As the user slides her pointer across the GUI keyboard, the processing unit 20 monitors the movement of the pointer 28 by selecting (and preferably highlighting) the key corresponding to the current location of the pointer 28 and making active its corresponding character. Thus, the active character inserted into the active position of the text buffer is updated with a subsequent character that corresponds to the key currently selected by the pointer. Whichever character is active at the time the pointer is lifted from the GUI keyboard, that character is accepted as a text character (See state 40). It is important to note that if the pointer is moved outside of the GUI keyboard, the active character is de-selected and the active position in the text buffer is left blank (i.e., there is no active character). If the pointer is lifted from the GUI keyboard when the active position in the text buffer is blank, nothing is accepted as a text character and the active position in the text buffer does not advance.

As described herein thus far, the preferred embodiment of the present invention identifies the active character in an area that is not obscured by the pointer 28. The preferred embodiment of the present invention also updates the active character with a subsequent character as the pointer 28 changes its location on the GUI keyboard 10. Moreover, the preferred embodiment of the present invention accepts the character that is active upon pointer-up as a text character regardless of the character that was selected and inserted into the active position within the text buffer upon pointer-down. In addition to that already described in the preferred embodiment, the present invention further provides a zooming/pop-up GUI keypad in relation with the GUI keyboard to further assist in identifying, selecting and accepting the desired character as a text character, which is the focus of the remainder of the discussion.

Figure 6:
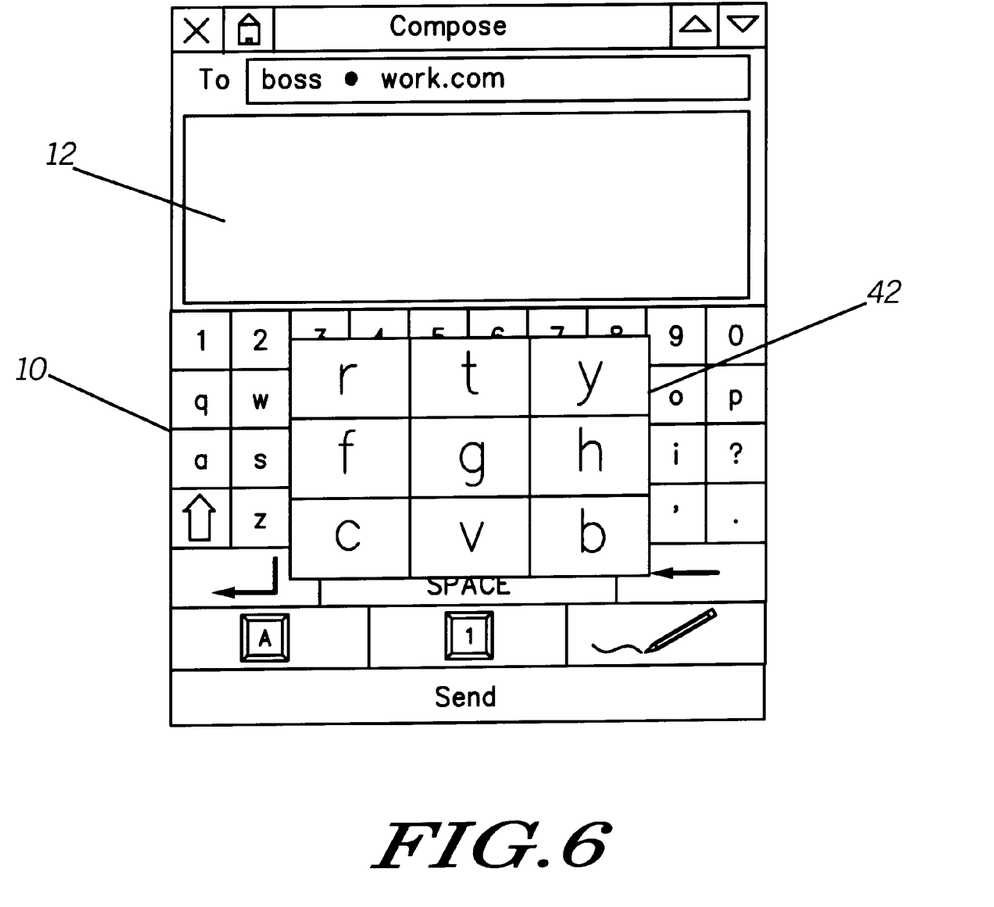
FIG. 6 illustrates a screen shot showing a first configuration according to an alternative embodiment of the present invention.

As shown in FIG. 6, when a key is selected on the GUI keyboard 10, a new GUI keypad 42 pops up according to an alternative embodiment of the present invention. This new pop-up GUI keypad 42 has fewer keys than the GUI keyboard 10, but the keys on the pop-up GUI keypad 42 are larger than the keys on the GUI keyboard 10. Preferably, the characters that correspond to the keys on the pop-up GUI keypad 42 depend on which key is selected (or which character is active) upon pointer-down or subsequently moved to prior to pointer-up. Further, the number of keys and the arrangement of the pop-up GUI keypad 42 are user determinable.

Figure 7:
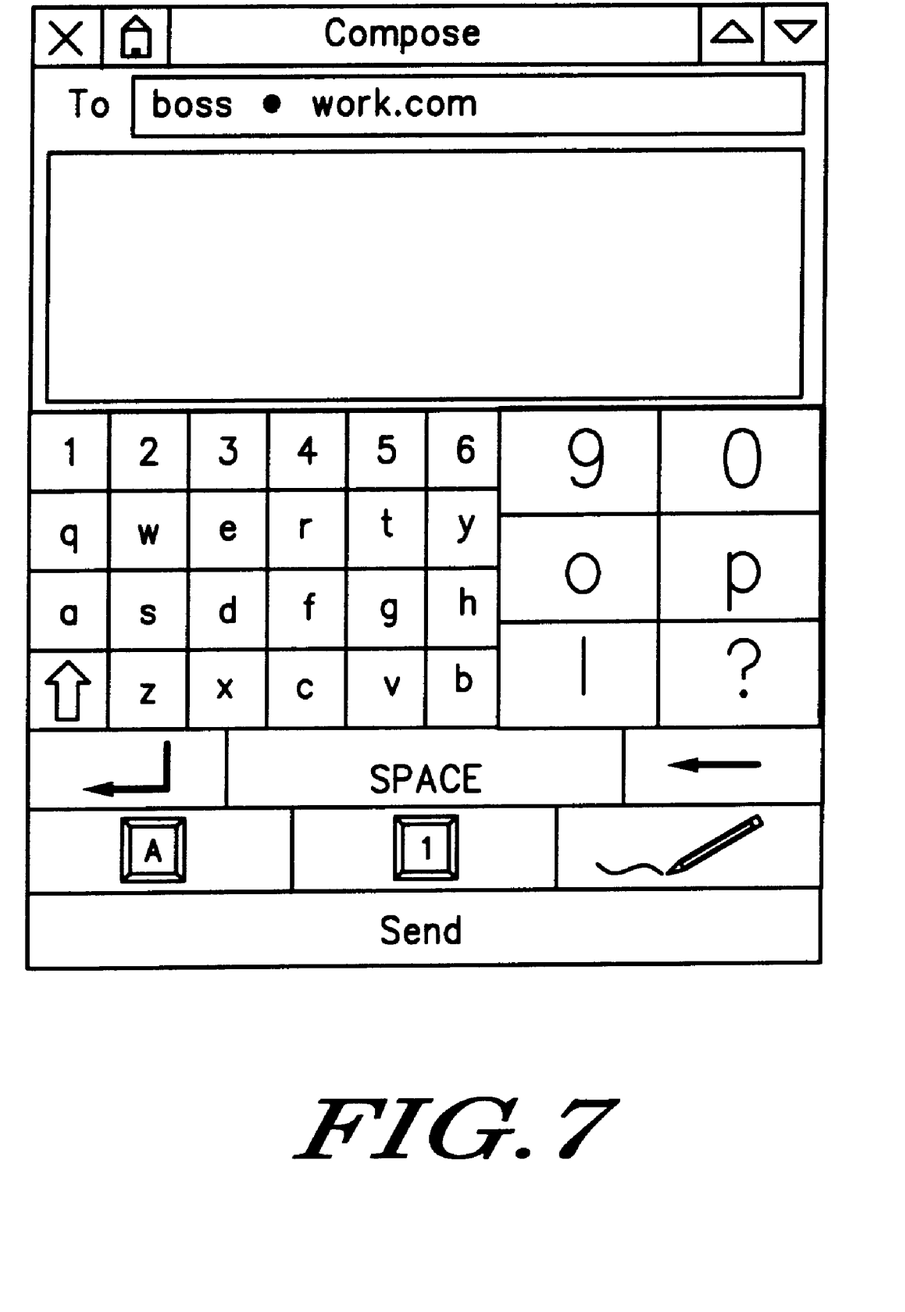
FIG. 7 illustrates a screen shot showing a second configuration according to the alternative embodiment of the present invention.
Figure 8:
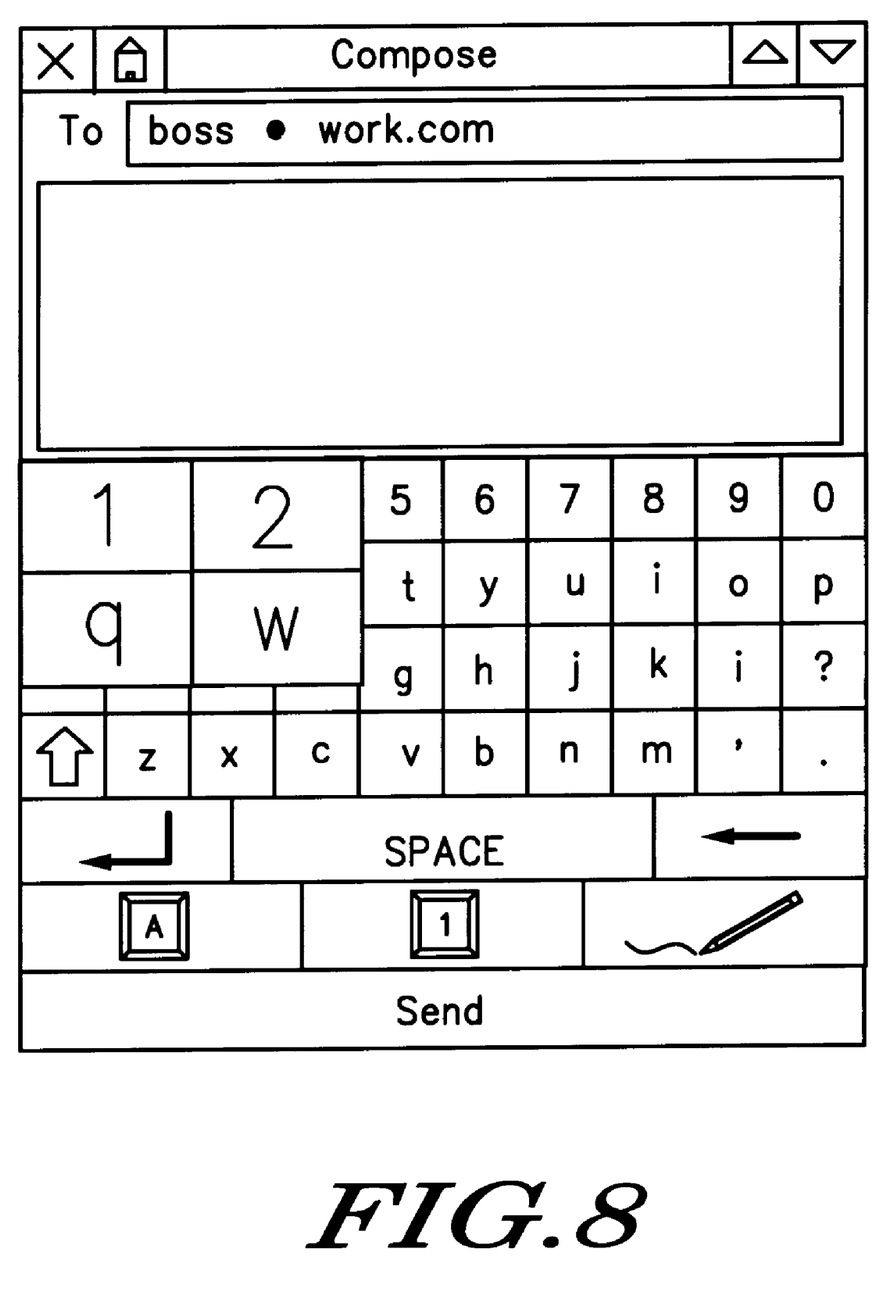
FIG. 8 illustrates a screen shot showing a third configuration according to the alternative embodiment of the present invention.

For example, as shown in FIG. 6, if the character "g" is active, the pop-up GUI keypad 42 may have nine keys arranged in a 3×3 grid. The first row of the pop-up GUI keypad 42 has the keys that correspond to characters "r", "t" and "y". The second row of the pop-up GUI keypad 42 has the keys that correspond to characters "f", "g" and "h". The third row of the pop-up GUI keypad 42 has the keys that correspond to characters "c", "v" and "b". In the same respect, if the character "p" is active, the pop-up GUI keypad 42 may have six keys arranged in 2×3 grid as shown in FIG. 7. If the character "1" is active, the pop-up GUI keypad 42 may have only four keys arranged in 2×2 grid as shown in FIG. 8.

It is desirable that the pop-up GUI keypad 42 displays the selected key (i.e., the key that corresponds to the active character) and a predetermined number of keys that are in the vicinity of the selected key to allow the user to easily select a neighboring key (that is magnified) to change the active character, if necessary. Preferably, the selected key is highlighted in the pop-up GUI keypad 42. It should be noted that a key can be selected from either the GUI keyboard 10 or the pop-up GUI keypad 42. Thus, since the keys on the pop-up GUI keypad 42 are relatively large in relation to the keys on the GUI keyboard 10, the active character is highlighted in the pop-up GUI keypad 42 and the active character is inserted in the active position of the text buffer, the user has good visual feedback about the identity of the active character before the character is accepted as a text character.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for implementing a graphical user interface (GUI) keyboard and a text buffer on an electronic device comprising:

providing a plurality of keys on the GUI keyboard, wherein each key corresponds to a character;

receiving a first pair of Cartesian coordinates that is representative of a current location of a pointer upon pointer-down;

enhancing a first key on the GUI keyboard that corresponds to the first pair of Cartesian coordinates;

inserting a first character in the text buffer that corresponds to the first key to identify an active character;

subsequently receiving a second pair of Cartesian coordinates that is representative of the current location of the pointer prior to pointer-up;

enhancing a second key instead of the first key that corresponds to the second pair of Cartesian coordinates;

replacing the active character with a second character that corresponds to the second key, thus making the second character the active character; and accepting a character that is active upon pointer-up as a text character, wherein the first character that was active upon pointer-down is different from the character that is active upon pointer-up, the enhancing step comprising enlarging a key that is enhanced and further comprising enlarging a predetermined number of keys surrounding the key that is enhanced, wherein the predetermined number of keys is eight.

2. The method according to claim 1 wherein the pointer is a stylus.

3. The method according to claim 1 further comprising highlighting a key on the GUI keyboard that represents the location of the pointer and wherein the character that is active corresponds to the key that is highlighted.

4. A method for implementing a graphical user interface (GUI) keyboard and a text buffer on an electronic device comprising:

providing a plurality of keys on the GUI keyboard, wherein each key corresponds to a character;

receiving a first pair of Cartesian coordinates that is representative of a current location of a pointer upon pointer-down;

enhancing a first key on the GUI keyboard that corresponds to the first pair of Cartesian coordinates;

inserting a first character in the text buffer that corresponds to the first key to identify an active character;

subsequently receiving a second pair of Cartesian coordinates that is representative of the current location of the pointer prior to pointer-up;

enhancing a second key instead of the first key that corresponds to the second pair of Cartesian coordinates;

replacing the active character with a second character that corresponds to the second key, thus making the second character the active character; and accepting a character that is active upon pointer-up as a text character, wherein the first character that was active upon pointer-down is different from the character that is active upon pointer-up;

the enhancing step comprising enlarging a key that is enhanced and further comprising enlarging a predetermined number of keys surrounding the key that is enhanced, wherein the predetermined number of keys is five.

5. A method for implementing a graphical user interface (GUI) keyboard and a text buffer on an electronic device comprising:

providing a plurality of keys on the GUI keyboard, wherein each key corresponds to a character;

receiving a first pair of Cartesian coordinates that is representative of a current location of a pointer upon pointer-down;

enhancing a first key on the GUI keyboard that corresponds to the first pair of Cartesian coordinates;

inserting a first character in the text buffer that corresponds to the first key to identify an active character;

subsequently receiving a second pair of Cartesian coordinates that is representative of the current location of the pointer prior to pointer-up;

enhancing a second key instead of the first key that corresponds to the second pair of Cartesian coordinates;

replacing the active character with a second character that corresponds to the second key, thus making the second character the active character; and accepting a character that is active upon pointer-up as a text character, wherein the first character that was active upon pointer-down is different from the character that is active upon pointer-up;

the enhancing step comprising enlarging a key that is enhanced and further comprising enlarging a predetermined number of keys surrounding the key that is enhanced, wherein the predetermined number of keys is three.

6. A method for implementing a graphical user interface (GUI) keyboard and a text buffer on an electronic device, comprising:

providing a plurality of keys on the GUI keyboard, wherein each key corresponds to a character;

enlarging a key on the GUI keyboard that represents the current location of the pointer and wherein the character that is active corresponds to the key that is enlarged;

enlarging a predetermined number of keys around the key that represents the current location of the pointer, wherein the predetermined number of keys is eight;

receiving a key selection from a pointer upon pointer-down that corresponds to a location of the pointer;

inserting a character in the text buffer that corresponds to the key selection to identify an active character;

as the pointer changes its location by moving across the plurality of keys, replacing the active character with a subsequent character that corresponds to the location of the pointer;

inserting a character in the text buffer that corresponds to the key selection to identify an active character.

7. An apparatus for implementing a graphical user interface (GUI) keyboard and a text buffer on an electronic device, wherein the GUI keyboard has a plurality of keys, comprising:

a display unit;

a touch sensitive surface overlaid on top of the display unit;

an input interface, coupled to the touch sensitive surface, for translating pressure on the touch sensitive surface into Cartesian coordinates;

a processing unit, coupled to the input interface, programmed to highlight a key that represents a current location of a pointer, select and insert a character into an active position within a text buffer that corresponds to the key highlighted to identify an active character, replace the active character, as the pointer moves across the GUI keyboard, with a subsequent character that corresponds to the current location of the pointer prior to pointer-up, thus making the subsequent character the active character, and accept a character that is active upon pointer-up as a text character, wherein the character active upon pointer-down is different from the character active upon pointer-up;

a keyboard graphic module coupled to the processing unit; and a display driver coupled to the processing unit and to the display unit.

* * * * *